United States Patent [19]
Blaurock et al.

[11] 3,838,928
[45] Oct. 1, 1974

[54] SPACER RING

[75] Inventors: Günter Blaurock; Hans-Georg Stender, both of Schweinfurt am Main; Werner Will, Geldersheim, all of Germany

[73] Assignee: Deutsche Star Kugelhalter G.m.b.H., Schweinfurt am Main, Germany

[22] Filed: Feb. 28, 1973

[21] Appl. No.: 336,807

[30] Foreign Application Priority Data
  Mar. 6, 1972  Germany............................ 2210708
  Apr. 27, 1972  Germany............................ 2220750

[52] U.S. Cl...................... 403/372, 85/8.8, 403/365
[51] Int. Cl............................................. F16d 1/06
[58] Field of Search .......... 403/365, 372, 279, 344; 85/8.8, 36; 308/236; 64/15 R, 17 A; 52/753 B, 753 E; 267/161, 163, 1.5; 206/45 FR; 229/14 C; 217/53

[56] References Cited
UNITED STATES PATENTS

| | | | |
|---|---|---|---|
| 2,084,777 | 6/1937 | Poggensee | 403/365 |
| 2,727,738 | 12/1955 | Lindley | 206/46 FR |
| 2,886,354 | 5/1959 | Bjorklund | 308/184 R |
| 3,700,271 | 10/1972 | Blaurock et al. | 287/52.04 |

FOREIGN PATENTS OR APPLICATIONS
1,047,719   7/1953   France................................ 308/236

*Primary Examiner*—Jordan Franklin
*Assistant Examiner*—Conrad L. Berman
*Attorney, Agent, or Firm*—Hans Berman; Kurt Kelman

[57] ABSTRACT

A unitary spacer element of resilient sheet metal of uniform thickness is formed with parallel, transversely juxtaposed rows of alternating, trough-shaped recesses and integral projections in each major face, the recesses in each face corresponding to aligned projections in the other face. The rows are separated from each other by elongated face portions free from recesses and projections, and all recesses are of equal depth and elongated transversely to the direction of row elongation.

9 Claims, 11 Drawing Figures

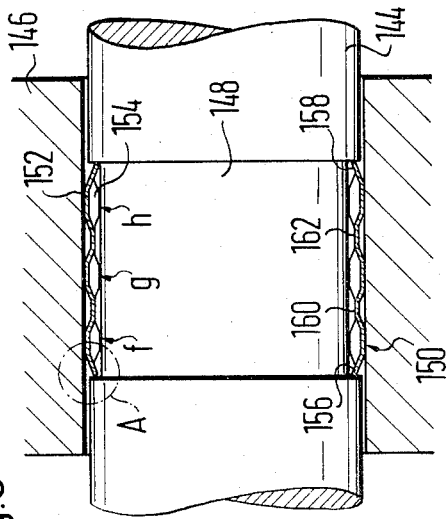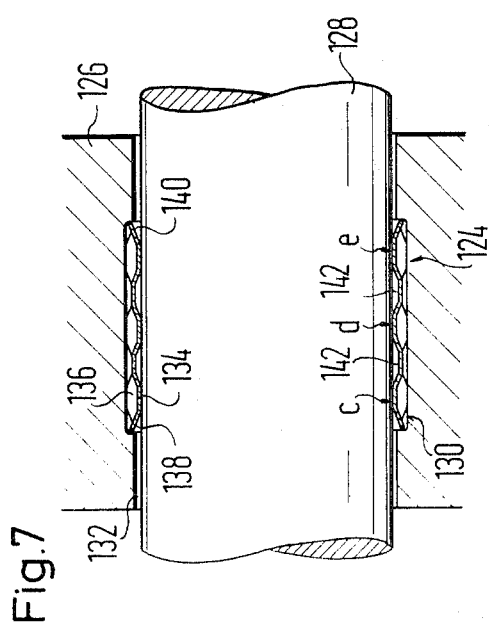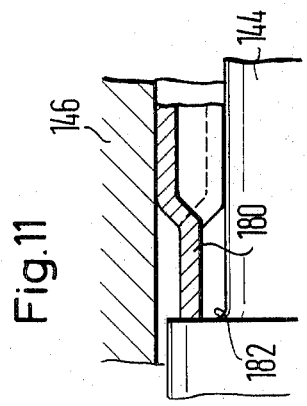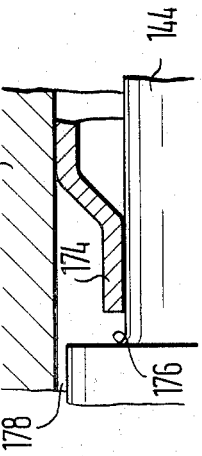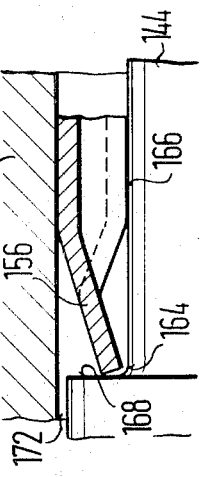

SPACER RING

This invention relates to spacer elements for connecting two structural members, such as parts of a machine, and particularly to an improvement in the spacer elements disclosed and claimed in our earlier U.S. Pat. No. 3,700,271.

An important application of spacer elements of this invention resides in the fastening of a shaft in an oversized bore of another machine part, such as a wheel, and our earlier invention provided for this purpose a tubular spacer ring bent into the desired shape from a strip of embossed, resilient sheet metal and having several circumferential rows of axially elongated projections on one major face and corresponding recesses in the other face. In the intended application, the ridges of the projections and the recesses in the other major face of the spacer ring engage the coaxial faces of the machine parts to be connected.

While the spacer rings of our earlier invention have been used successfully, they are difficult and/or costly to manufacture when the gap to be bridged by the spacer ring is relatively wide. The height of the projections must approximately equal the width of the gap, and the shaping of a suitable spacer ring presents the problems commonly encountered in the deep-drawing of sheet metal. The material employed must satisfy exacting requirements, the first cost of the necessary dies and tools is high, and they are subject to relatively rapid wear.

These common deep-drawing problems are further complicated in the making of a spacer ring of our earlier invention by the need for recesses which are narrow and relatively short as compared to their depth and closely juxtaposed for the necessary, multi-point, frictional contact with the connected machine parts. As is inherent in such an arrangement, the flanks or side walls of the deep recesses are steep, and this fact further contributes to the difficulties, particularly to rapid tool wear.

It is an object of this invention to provide a spacer element of the general type and mode of operation of our earlier spacer ring which, for a given overall thickness and equal operating characteristics, can be made from less costly sheet metal at lower tool cost than was possible heretofore.

With this object and others in view, the instant invention provides a spacer element of sheet material having substantially uniform thickness and two major, parallel faces separated by the thickness of the material. The element is formed with several rows of projections and recesses in each of its faces, the rows being elongated in a common direction and transversely juxtaposed. Each recess is approximately troughshaped and aligned in the direction of material thickness with a projection in the other face. Each row in each of the faces includes both projections and recesses, and respective portions of the faces elongated in the common direction of the rows are free from projections and recesses.

As compared to the spacer ring of our earlier invention, the instant spacer element has projections on both major faces, and the combined height of these projections need only be as great as the height of the projections on one face of the earlier spacer ring for bridging a gap of the same width. Under otherwise equal conditions, the depth of draw in making the spacer elements of the instant invention is only approximately one half of that required in the earlier spacer ring.

Other features, additional objects, and many of the attendant advantages of this invention will readily become apparent from the following detailed description of preferred embodiments when considered in connection with the appended drawing in which:

FIG. 1 shows a spacer element of the invention in plan view;

FIGS. 2 and 3 respectively illustrate the element of FIG. 1 in section on the lines II — II and III — III;

FIG. 7 is a fragmentary sectional view of a machine assembly in which a shaft is attached to another machine member by a spacer element analogous to that illustrated in FIGS. 4 to 6;

FIG. 8 shows a modification of the assembly of FIG. 7 in a corresponding view;

FIG. 9 illustrates a portion of the device of FIG. 8 indicated in FIG. 8 by a broken-line circle A, but on a larger scale;

FIG. 10 shows an assembly including a spacer ring of our earlier invention in a view analogous to that of FIG. 9; and FIG. 11 shows the device of FIG. 9 modified by use of the spacer element of FIGS. 1 to 3.

Figure 1:
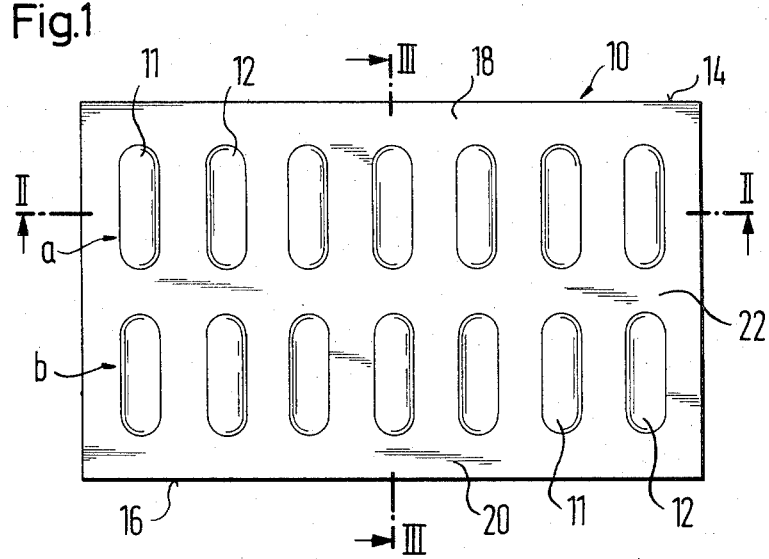
Figure 2:
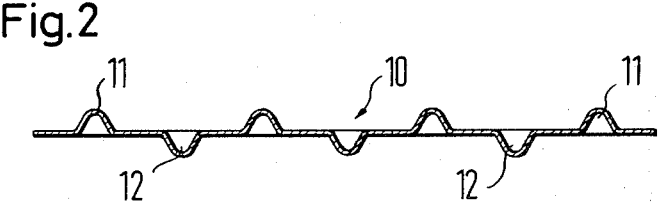
Figure 3:
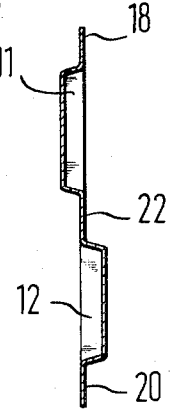

Referring now to the drawing in detail, and initially to FIGS. 1 to 3, there is seen a spacer element 10 of the invention which was formed between two press platens from a rectangular, flat piece of sheet metal. Each major face of the element 10 carries two rows a and b of longitudinally alternating projections 11 and recesses 12, each recess 12 in one major face being aligned with a projection 11 on the other face as is inherent in the uniform thickness of the original metal sheet which is not significantly altered by the press-forming operation.

The original planar configuration of the sheet metal is undisturbed in the elongated strip portions 18, 20 of the element 10 extending along the edges 14, 16 which connect the two major faces, and in a similar strip portion 22 which separates the two rows a and b.

The recesses 12 are elongated transversely to the common direction of elongation of the rows a and b, and the projections 11 are correspondingly elongated. The recesses and projections of each row are longitudinally separated by undistorted bridge portions of the original sheet metal, and these bridge portions are located in a common plane with the strip portions 18, 20, 22. The projections 11 extend to identical respective heights from the two major faces of the element 10, and the depth of each recess 12 relative to that plane is the same.

Each recess 12 is longitudinally aligned with a projection 11 in the other row on the same major face so that the projections on each face form a zig-zag pattern of supporting points for an engaged machine part.

The spacer element shown in FIGS. 1 to 3 may be employed as a shim between two opposite planar faces of machine parts in an obvious manner not specifically illustrated, or it may be bent into an open ring about an axis parallel to the direction of elongation of the projections 11 and recesses 12 and interposed between a cylindrical shaft and an oversized bore of another machine part receiving the shaft, as has been disclosed in the afore-mentioned earlier patent, and will be further explained hereinbelow. The effective thickness of the illustrated spacer element is about twice the height of one projection 11, yet the depth of draw required for shaping the element is only equal to approximately the height of one projection.

Figure 5:
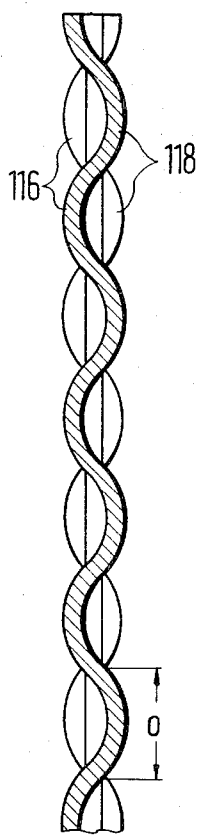
FIGS. 5 and 6 are respective sectional views of the element of FIG. 4 taken on the lines V — V and VI — VI.
Figure 4:
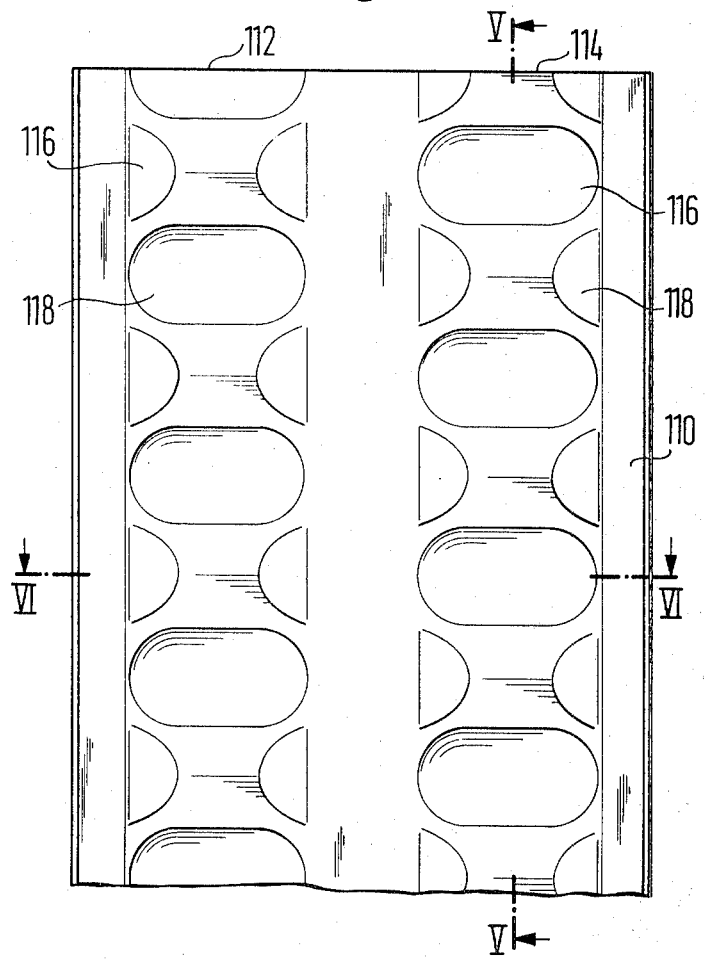
FIG. 4 illustrates another spacer element in a view corresponding to that of FIG. 1.
Figure 6:
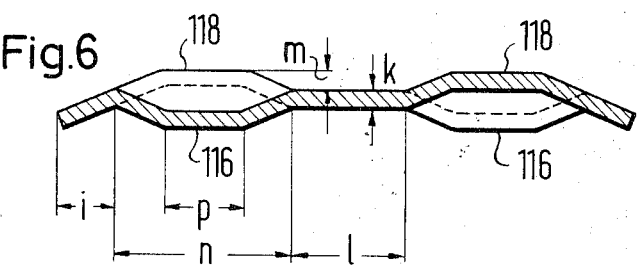

Because of the relatively wide spacing of the ridges or supporting points of the projections 11 in the aforedescribed spacer element, and because of the relatively small resistance of the projections to compressive stresses, due to the angular relationship of the projections and of the interposed flat bridge portions, the modified spacer element 110 shown in FIGS. 4 to 6 is preferred for heavy-duty applications.

In common with the device described with reference to FIGS. 1 to 3, the element 110 has two rows 112, 114 of alternating identical recesses 116 and identical projections 118 separated by an elongated strip of undeformed, flat sheet metal, the elongated projections 116 in each row being longitudinally aligned with respective trough-shaped recesses 118 in the other row on each face of the spacer element.

The projections and recesses in each row are contiguously juxtaposed so that the cross section of the element taken longitudinally of each row, as is seen in FIG. 5, is of continuously undulating, and practically sinusoidal shape. As is also evident from FIG. 5, the sinusoidal cross-sectional shapes of the two spacedly juxtaposed rows 112, 114 are offset in phase by approximately 180°. Because of this shape, the spacer element of FIGS. 4 to 6 has closer spaced crests of projections and greater compressive strength than the element of FIGS. 1 to 3 under otherwise comparable conditions.

The elongated edge strips of the spacer element of FIGS. 4 to 6 are smooth, that is, free from projections and recesses, but they differ from the corresponding portions 18, 20 of the first-described spacer element by being angularly offset from the median plane of the element 110 at a small angle for reasons that will presently become apparent.

Dimensional relationships of the several parts of the spacer elements of the invention are important for achieving desired mechanical properties, and will readily be chosen by calculation or by trial and error. Good performance has been achieved with the spacer element of FIGS. 4 to 6 when the dimensions indicated in FIG. 6 approximately satisfied the following relationships, wherein k is the sheet metal thickness, m is the height of each projection 118, n is the overall length of the projection 118, l is the longitudinal end-to-end spacing of the respective projections and recesses in the two rows, p is the width of the flat ridge of each projection, and i is the width of each smooth edge strip:

$n:o = 1.7:1$   $n:m = 9:1$   $n:k = 9:1$
$n:p = 2:1$   $n:i = 3.2:1$   $n:l = 1.6:1$

These optimum relationships were determined for a sheet metal thickness of $k = 0.3$ mm, and may have to be modified for other metal thicknesses.

The spacer element of FIGS. 4 to 6 may be employed as a flat shim, as described with reference to FIGS. 1 to 3, or it may be bent into a split ring as is shown in FIGS. 7 and 8.

FIG. 7 illustrates an assembly in which a wheel or like machine part 126 is frictionally secured on a cylindrical shaft 128 received in an oversized cylindrical bore 132 of the wheel 126 by a spacer ring 124 prepared by bending a spacer element closely similar to the element 110 over a mandrel greater in diameter than the shaft 128, the length of the element being such that its two longitudinal ends form a gap when bent over the mandrel. The ring 124 is partly received in a shallow annular groove 130 in the inner circumferential face of the wheel 126, and held in position partly by the compressive stress exerted by the wheel 126 on the ring 124.

It differs from a ring prepared by bending the element 110 mainly by being provided with three circumferential rows c, d, e of alternating, axially elongated projections and recesses 134, 136. The smooth edge strips 138, 140 taper conically in a direction axially away from each other.

The assembly illustrated in FIG. 8 differs from that described with reference to FIG. 7 that the spacer ring 150 is not received in an annular groove of a concavely cylindrical wheel face, but in the annular groove 148 in the convexly cylindrical outer face of a shaft 144, the opposite face of a wheel 146 in its oversized bore being free from a groove.

The ring 150 has three rows f, g, h of circumferentially alternating projections and recesses 152, 154 separated by smoothly cylindrical, circumferentially elongated strip portions 160, 162, the ring being bounded axially by conically tapering, smooth conical edge portions 156, 158. The ring 150 is secured in the groove 148 at least in part by its own resiliency, the ring having been formed on a cylindrical mandrel smaller in diameter than the shaft 144 so that the longitudinal ends of the initially planar and rectangular spacer element overlapped circumferentially. The ring 150 thus is stressed by the shaft 144 in the assembled apparatus.

As is better seen in FIG. 9, the groove 148 has a cylindrical, axial bottom wall 166 and annular radial end walls 168, a fillet 164 being formed at the juncture of the bottom and end walls. The smooth conical edge portion 156 of the spacer ring 150 is directed toward the fillet 164 in an obliquely axial and radially inward direction. The fillet 164 engages the free edge of the portion 156 at least during insertion of the ring 150 and tends to hold it in its radial position. No forces are transmitted between the fillet 164 and the edge portion 156 which would tend to shift the edge portion 156 into the gap 172 between the wheel 146 and the shaft 144.

If a similar assembly were equipped with a spacer ring of our earlier invention, as is shown in FIG. 10, the smooth edge strip 174 of the earlier spacer ring, if engaging a fillet 176 in a groove of the shaft 144, would be deflected by the fillet toward a gap 178 between the shaft 144 and the associated wheel 146, and the spacer ring would not survive repeated jamming in the gap 178. It was necessary heretofore to avoid a fillet as shown at 176, and to machine the groove walls so as to meet at a sharply rectangular corner, an arrangement much less desirable than an integral fillet because of the higher machining cost and the danger of stress concentration at the corner.

FIG. 11 illustrates the smoothly cylindrical edge strip 180 of a spacer ring of the instant invention analogous to that shown in FIGS. 1 to 3 interposed between a shaft 144 and a wheel 146 in a groove of the shaft. In the initially flat spacer element, the edge strip 180 was located in a common median plane with other undisturbed, planar portions of the element. When the element was bent into a ring, as described above, the edge strip 180 was radially offset from the ridges of the projections on either major face of the spacer ring, and therefore safely clears the fillet 182 in the receiving groove. No relative movement of the spacer ring and the shaft can cause camming engagement of the edge strip 180 with the fillet 182 and the damage to the spacer ring which could be caused thereby.

The spacer elements of our present invention have additional, inherent advantages over our earlier invention. Unless the tools and dies employed in making spacer rings having projections on one face only are kept aligned with a precision not normally practical under manufacturing conditions, the drawing of deep recesses sets up internal stresses which cause the spacer element to contract into a helical coil when released from the press so that an additional straightening operation is needed. The problem is non-existent with a spacer element in which the recesses are formed in both major faces, and particularly good balance of internal stresses is achieved when each recess is longitudinally aligned with a projection in an adjacently juxtaposed row as illustrated in FIGS. 1 to 6.

Any other measure which enhances the symmetry of the spacer element relative to the plane of the initially flat blank has been found to facilitate manufacture and reduce the wear of the tools and dies. It is advantageous, therefore, to make all recesses of equal depth relative to that plane. The sinusoidal, sectional contour of each row of recesses and projections, best seen in FIG. 5, provides the best combination of spacer strength and low tooling cost known to us at this time. The illustrated 180° phase offset of the sinusoidal undulations in adjacent row sections inherently causes the preferred longitudinal alignment of each recess with an adjacent projection in a juxtaposed row.

Trough-shaped recesses which are not elongated transversely of the associated row retain some of the advantages of this invention, but elongated recesses and corresponding projections are preferred. The advantages of the invention are largely lost in a spacer ring having but a single row of projections and recesses regardless of their configuration as will be apparent to those skilled in this art.

It should be understood, of course, that the foregoing disclosure relates only to preferred embodiments of the invention, and that it is intended to cover all changes and modifications of the examples of the invention herein chosen for the purpose of the disclosure which do not depart from the spirit and scope of the appended claims.

What is claimed is:

1. A spacer element of sheet material having substantially uniform thickness and two major, parallel faces separated by said thickness,
   a. said element being formed with a plurality of rows of projections and recesses in each of said faces,
      1. said rows being elongated in a common direction and transversely juxtaposed,
   b. each recess having the shape of a trough and being aligned with a projection on the other face in the direction of said thickness,
   c. each row in each of said faces including respective pluralities of projections and recesses, and
   d. respective portions of said faces elongated in said common direction being free of projections and recesses,
      1. said element having two edges connecting said faces and elongated in said common direction, two of said elongated portions of each face extending along said edges respectively,
      2. said faces being of substantially cylindrical overall shape about an axis transverse to said common direction, and the elongated portions extending along said edges being conically arcuate about said axis.

2. An element as set forth in claim 1, wherein one of said elongated portions is interposed between two of said rows, the respective depths of said recesses in both faces relative to said elongated portions being substantially equal.

3. An element as set forth in claim 1, wherein said recesses are elongated transversely to said common direction, the recesses and projections in each row alternating and being contiguously juxtaposed in said common direction, the cross section of said element longitudinally through each row being of continuously undulating shape.

4. An element as set forth in claim 3, wherein said shape is substantially sinusoidal, the sinusoidal cross-sectional shapes of two juxtaposed rows being offset in phase by substantially 180°.

5. An element as set forth in claim 1, wherein said projections and said recesses are elongated transversely of said common direction, each recess in each row being aligned in the direction of elongation thereof with a projection in an adjacently juxtaposed row.

6. An element as set forth in claim 1, wherein said recesses are axially elongated.

7. An assembly comprising, in combination:
   a. a first member formed with a bore and having a concavely cylindrical first face in said bore about an axis;
   b. a second member partly received in said bore and having a coaxial, convexly cylindrical second face in said bore,
      1. one of said faces being formed with an annular recess therein; and
   c. an annular spacer element of sheet metal having substantially uniform thickness and two major, parallel faces of cylindrical overall shape separated by said thickness,
      1. said element being partly received in said recess and formed with a plurality of circumferential rows of projections and recesses in each of said major faces, said rows being axially juxtaposed,
      2. each recess having the shape of a trough and being aligned radially relative to said axis with a projection on the other major face,
      3. each row in each of said major faces including projections and recesses, the projections of said two major faces respectively abutting against said members,
      4. respective portions of said major faces circumferentially elongated relative to said axis being free of projections and recesses,
      5. said recess having an annular axial bottom face, a radial end face, and a fillet connecting said bottom and end faces, said element having a circumferential edge connecting said two major faces, respective ones of said elongated portions of said two major faces being conically arcuate about said axis and directed toward said fillet in a direction obliquely inclined relative to said axis.

8. An assembly as set forth in claim 7, wherein said spacer element is axially split and of resilient material, abutting engagement of said projections with one of said members holding said spacer element under resilient stress.

9. An assembly as set forth in claim 7, wherein said rows are spaced in the direction of said axis, the rows of each pair of said rows being separated by one of said circumferentially elongated portions.

* * * * *